May 25, 1943.　　　M. JUNGMANN　　　2,320,183
ORTHOPAEDIC DEVICE
Filed April 10, 1942
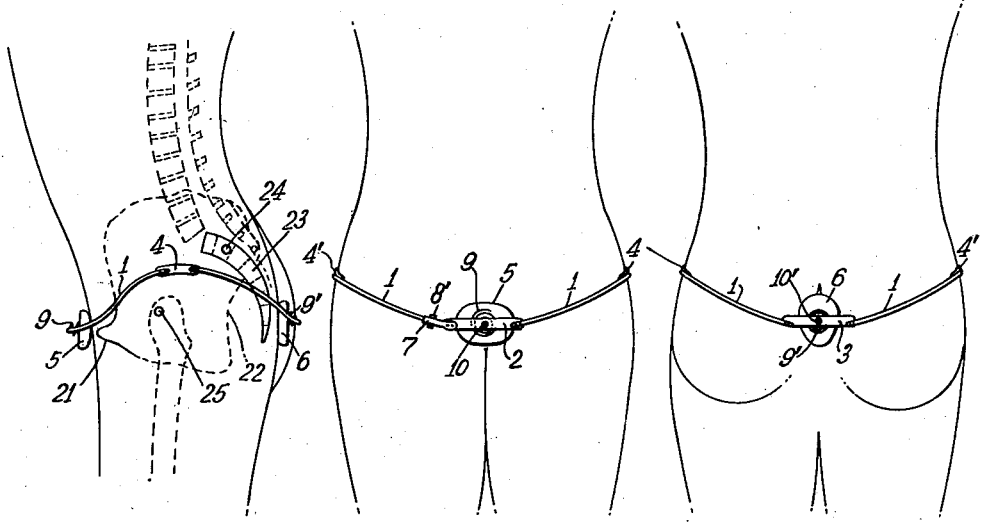
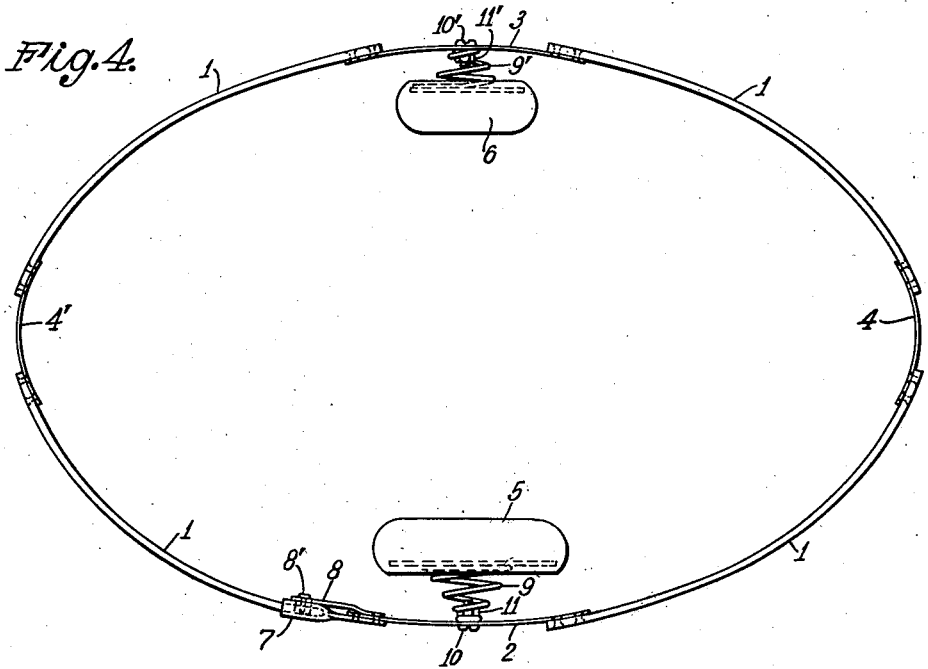
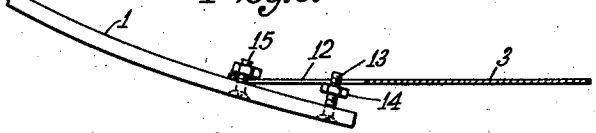
INVENTOR
Martin Jungmann
BY
ATTORNEY Patented May 25, 1943

2,320,183

UNITED STATES PATENT OFFICE 2,320,183

ORTHOPEDIC DEVICE

Martin Jungmann, New York, N. Y.

Application April 10, 1942, Serial No. 438,399

7 Claims. (Cl. 128—78)

This invention relates to an orthopedic device, and has particular relation to an orthopedic pelvic lever for preventing and combating disturbances of the body mechanics resulting in or caused by fatigue phenomena, and their various physiological and pathological consequences in the muscular and other systems of the human body.

The construction of the human body includes a complicated system of levers primarily consisting of bones and muscles, said system being built in accordance with the principle of a so-called lazy-tongs system, and the upright carriage of a living human body is a result of the position of said levers relative to each other, and the position of the body in the space. Leaving aside the conditions of working, the human body, in its upright position, is under the action of gravitation in accordance with its weight, and under the counteraction of body forces, which vary in accordance with the position of the body and serve to produce and maintain a balance with the gravitation force acting on the respective human body.

In the upright position of a normally functioning living human body, a balance or compensation between the force of gravitation acting upon the same, and the counter-acting body forces, can be obtained without undue strain. If, however, the normal functioning and the coordinated, and well balanced play of forces in the motive mechanism of the human body is disturbed, for example as a consequence of an operation or by overwork, the production and maintenance of said balance imposes an overstrain upon the human organism, which cannot be compensated by the reserve forces of the body. In such a case a condition of static-dynamic decompensation results, i. e. a mechanical dis-equilibrium of postural body mechanics, especially in the upright position of the human body.

The symptoms and consequences of such a condition are manifold, such as fatigue, weak back, backaches, lumbago, sciatica, arthritis, lumbosacralis, sacro-iliac condition, or pains e. g. in the lower abdomen etc. Such symptoms and consequences are particularly often caused by overwork and overfatigue, especially by long standing or working in prone position of the worker. In such cases, the gravitational forces impose undue strain, and wear and tear upon the muscles, bones, and joints, as the gravity due to the body weight exerts an undue downward pressure within the framework of bones. Due to the construction of the body frame, there is a tendency to turn the bones around the joints, and this tendency of turning the bones, which represent mechanical levers, must be prevented, counteracted or often even reversed by suitable mechanical forces in order to prevent or relieve the above mentioned symptoms and/or consequences.

The main object of my invention is, therefore, to provide an orthopedic device which is adapted to mechanically support and influence certain elements of the motive mechanism of the human body, and to prevent and/or counteract undue strain on the tissues, and to relieve pain and/or other adverse effects of the above mentioned mechanical dis-equilibrium of the human body.

It is another object of my invention to provide an orthopedic pelvic lever which is capable of bringing about the above mentioned mechanical support without working on soft parts of the body, and without undesired interference with internal organs and their functioning.

It is also an object of my invention to exclude, in my orthopedic device, any rigidity or stiffness, which could be transmitted to the body, and could so affect the structural and functional properties of the living matter and the whole organism.

A further object of this invention consists in providing an orthopedic pelvic lever of the above described type, which can be adjusted to the body of the wearer, and permanently worn without interfering with the movements of the wearer.

It is also an object of my invention to provide an orthopedic device which mainly consists of durable metallic parts, and keeps its original shape for a practically unlimited period of time.

Other objects and advantages will appear to those skilled in the art from the following specification and claims, and the appended drawing which illustrates, by way of example, some preferred embodiments of my invention, and form a part of this specification, and in which Fig. 1 is a side view of my orthopedic device applied to a human body, while Figs. 2 and 3 are front and back views, respectively, of the device shown in Fig. 1;

Fig. 4 is a top view of my pelvic lever on an enlarged scale, and

Fig. 5 is a detail view illustrating a modified, adjustable embodiment of a spring adapted to be used in my orthopedic device.

Referring now to the drawing, Fig. 1 diagrammatically illustrates the mechanics of the pelvic region of a human body in upright position, and my orthopedic device applied to said body. 2l is the pubic bone, 22 the iliac bone, and 23 the sacrum. The sacro-iliac joint is shown at 24, and the hip joint at 25. The orthopedic device shown in provided with pads 5 and 6 arranged in said device in the manner described in detail hereinafter. In order to bring about a counteraction on the gravitational forces in the lever system of the pelvic frame, the points of insertion must be: (a) in front, the pubic bone, and (b) in the back, the lower part of the sacrum beneath the sacro-iliac joint. The device according to my present invention acts in such a manner that the distance between said two points of insertion is not permitted to increase or acts in the direction to decrease said distance. This effect is adapted to induce turning of the sacrum around the sacro-iliac joint, having as punctum fixum the anchor point in front, i. e. the pubic bone, while the punctum mobile is formed by the lower end of the sacrum. By the leverage of the lower part of the sacrum, the upper part of this bone is induced to turn upward-backward around the sacro-iliac joint. As a second effect, the pubic bone, as the punctum mobile, is pressed downward-backward, having the weight and resistance of the lower part of the sacrum as punctum fixum. Owing to this action, the iliac bone tends to turn in the hip joint, whereby the leverage of the frontal part of the pelvic downward is connected with a lifting of the other part of the pelvic bone behind the hip joints, and so lifting the whole back opposite to the tendency induced by the body weight.

These two combined effects, which are interdependent and inseparable, are obtained by the device according to my present invention, illustrated by way of example, in Fig. 4.

My orthopedic device shown in this figure comprises 4 curved, rigid parts denoted with reference numbers 1. These parts, which consist of a suitable metal, such as flat bar iron or not tempered steel, are connected by means of steel band springs 2, 3, 4 and 4', and form with the latter, in assembled condition a device, the top view of which approximately corresponds to an ellipse, as shown in Fig. 4. The ring elements connected by steel springs 4 and 4', however, show a moderate ascent, as shown in Figs. 1, 2 and 3. Spring elements 2, 3, 4 and 4' are so designed and dimensioned that they provide for the necessary elasticity and spring effect. In order to obtain the necessary elasticity and strength, the spring elements, which connect parts 1, may have f. e. a somewhat greater width and they may be less thick than said parts 1. The ends of springs 4, 4' and 3, and one end of spring 2, are firmly connected with the adjacent ends of element 1, by means of rivets, for example, while the other end of spring 2 is separably connected with the end of the adjacent element 1, by means of a lock fastened to spring 2, and comprising lock sleeve 7, and a spring latch 8 provided with a bolt 8', fitting into a perforation of the end of said adjacent element 1. Instead of the lock shown, any other lock of suitable, simple construction may be used.

A front pad 5, which may preferably have an aproximately elliptical shape, is fastened to the centre of spring element 2 by means of a conical spiral spring 9, screw 10, and fastening nut 11, and a rear pad 6, which is situated opposite to front pad 5, and has an approximately egg-shaped contour, is fastened in a substantially similar manner to the centre of spring 3, by means of a conical spiral spring 9', screw 10', and fastening nut 11'. Owing to their connection with spring elements 2 and 3 by means of conical spiral springs in the manner shown in Fig. 4, pads 5 and 6 are movable in any desired direction. Pads 5 and 6 each, comprise a plate which is curved to a dish-like shape and has a concave interior surface, and to the outer surface of which one end of the conical spiral spring is fastened by soldering or welding, for example. Said parts are preferably provided with a cushion or layer of a suitable elastic or resilient material, such as rubber, said layer having a concave surface which adapts itself to the shape of the bone to be supported. An air-filled rubber cushion may also be used. Said plate and said cushion or layer may be surrounded by a wrapping of suitable material, f. e. felt or leather.

It will be understood from the above description and the drawing that pads 5 and 6 are adapted to contact with the body of the wearer and to exert the above described effects. The dimensions of pads 5 and 6 are just large enough to cover and influence the respective bones, i. e. the pubic bone, and the lower part of the sacrum beneath the sacro-iliac joint, respectively. There is, therefore, no covering or involvement of abdominal muscles by pad 5 in the front, and pad 6 is just large enough to catch the end of the sacrum. No shearing is possible on the sacro-iliac joint, and there is no interference with the oscillatory motion in the sacro-iliac and lumbar joints. The pads being movable around one point of fixed cone-like spring coils, are capable of following the movements of the body.

The orthopedic pelvic lever or device according to my invention is sized and shaped in such a manner that only pads 5 and 6 are in contact with the body of the wearer, while all other parts of the device are spaced from the body and do not interfere with the movements of the same.

Adjustment of my orthopedic device to the body of the wearer is obtained according to my invention by the combined use of tempered metal springs, which are positioned in use on the sides of the wearer, and rigid metallic elements which are bent in accordance with the shape of the human body, and connected with said springs. Adjustment of the pressure to be applied to the lever system of the body of the wearer can be conveniently obtained by the choice of suitable springs and suitable curvature of the rigid parts of the device. The action of the steel band springs starts when spiral springs 9 and 9' are compressed or tensioned to a certain extent.

The action of the here described orthopedic pelvic lever or device on the human body represents fundamentally not only the leverage, and thereby a supporting effect on the bones, but also a reconveying and readministration of swinging kinetic energy originally produced by the movements of the body, and balancing out the influence on two joints in accordance with the action-reaction principle by the use of a spring system with recoil effect.

In the modification shown in Fig. 5 spring 3 is adjustably connected with rigid element 1. In order to obtain an adjustable connection, spring 3 is provided with a longitudinal slot 12, and is fastened to element 1 by means of a fixed screw 15 and an adjusting screw 13. Adjustment may be effected by shifting spring 3 along the longitudinal slot, and/or adjusting the relative position of parts 1 and 3 by means of adjusting nut 14. Adjustment may also be made without the use of a slot by an adjusting screw 13 and nut 14, and a corresponding perforation in spring 3. One or more joints of the ring may be provided with the adjustable connection shown in Fig. 5 or similar connections.

Instead of using in my orthopedic device rigid parts consisting of flat bar iron, such rigid parts may also consist of rod iron, or suitably shaped hollow elements of iron or other metals, such as aluminum or its alloys. The individual elements may be connected by welding, other types of spiral springs may be substituted for the conical spring shown, and the rigid parts may also consist of a suitable synthetic material such as reinforced and hardened plastic. The rigid parts and the springs used in my device, may be covered with a suitable material such as leather or plastics. It will be understood by those skilled in the art that the above described and other modifications may be made without departing from the spirit of my invention as defined in the appended claims. However, it is essential for carrying out my present invention that the orthopedic device is formed by the above disclosed combination of bent, rigid parts and band springs connecting said rigid parts, to a system of the above described shape and construction, and by pads spaced from and fastened to the front and rear spring in the above described manner.

I have found that application of the here disclosed orthopedic device or pelvic lever provides quick and effective relief to persons suffering from symptoms caused by the above mentioned disturbances.

I claim:

1. An orthopedic oval device comprising curved, rigid parts, and spring elements arranged between and connected with said rigid parts, a front pad centrally arranged on a spring element of said device and spaced from said device and connected therewith by means of a spring element, and a rear pad arranged centrally and in a diametrically opposite position relative to said front pad, on a spring element of said device and spaced from said device and connected therewith by means of a spring element said front pad and said rear pad being adapted to engage the public bone and the lower part of the sacrum, respectively, the rigid and spring elements forming the oval device being adapted to be worn in spaced relation from the body.

2. An orthopedic oval device formed by a steel band front spring and a steel band rear spring diametrically arranged at the ends of the minor axis of said oval device, and two steel band side springs diametrically arranged at the ends of the major axis of said oval device, curved rigid parts arranged between and connected with side springs and said front and rear springs, respectively, and forming lines slightly ascending from said front and rear springs, respectively, toward said side springs, a front pad centrally arranged on, spaced from, and fastened to the centre of said front spring by means of a conical spiral spring, and a rear pad centrally arranged on, spaced from, and fastened to the centre of said rear spring by means of a conical, spiral spring said front pad and said rear pad being adapted to engage the pubic bone and the lower part of the sacrum, respectively the rigid and spring elements forming the oval device being adapted to be worn in spaced relation from the body.

3. An orthopedic, oval device as claimed in claim 2, in which one end of the front spring forms a lock with the adjacent end of a rigid part.

4. In an orthopedic device of the type described, a front pad adapted to bear against the pubic bone, and a rear pad adapted to bear against the lower part of the sacrum, said front pad and rear pad being under the action of an elastic, oval ring system formed by a front steel band spring, a rear steel band spring, two steel band side springs, and four intermediate rigid parts arranged between the steel band springs, spiral springs holding said pads in spaced relation from, and connecting the same with the corresponding steel band springs of said elastic ring system adapted to surround the trunk of the wearer in a spaced relation.

5. In an orthopedic device of the type described, a front pad adapted to bear against the pubic bone, and a rear pad adapted to bear against the lower part of the sacrum, said front pad and rear pad being under the action of an elastic, oval ring system, and conical spiral springs holding said pads in spaced relation from, and connecting the same with said elastic ring system which is formed by a steel band front spring and a steel band rear spring diametrically arranged at the ends of the minor axis of said oval system, and two steel band side springs diametrically arranged at the ends of the major axis of said oval system, and four curved, rigid parts situated between and connected with said front, rear, and side springs, respectively, said front pad and said rear pad being connected with said steel band front spring and steel band rear spring, respectively, by means of conical spiral springs, the tip of which is connected to the band spring, while its base is connected to the pads, the rigid parts arranged between said front and rear band springs, respectively, and said side band springs, slightly ascending toward said side band springs, and said oval ring system being adapted to surround the trunk of the wearer in a spaced relation.

6. An orthopedic device as claimed in claim 5, in which at least one adjustable connection is provided between the front and rear band spring, respectively, and an adjacent end of a rigid part.

7. An orthopedic pelvic lever of the type described, said lever comprising a front pad adapted to bear against the pubic bone, and a rear pad adapted to bear against the lower part of the sacrum, said front pad and said rear pad forming a part and being under the action of an elastic oval system formed by a front and a rear steel band spring arranged at the opposite ends of the minor axis of the oval system, two steel band side springs arranged at the opposite ends of the major axis of the oval system, and four intermediate rigid parts arranged between and connected with the adjacent ends of said front springs and side springs, said system being adapted to surround the trunk of the wearer in a spaced relation.

MARTIN JUNGMANN.